United States Patent [19]

Piquerez

[11] Patent Number: 5,269,433
[45] Date of Patent: Dec. 14, 1993

[54] CLOSURE DEVICE FOR AN ORIFICE PROVIDED WITH A SAFETY DEVICE NOTABLY FOR SEALING THE ORIFICE OF A CONTAINER FOR CHEMICAL PETROLEUM OR ANALOGOUS PRODUCTS

[75] Inventor: Claude Piquerez, La Tour-de-Peilz, Switzerland

[73] Assignee: Machao A.G., Zug, Switzerland

[21] Appl. No.: 907,016

[22] Filed: Jul. 1, 1992

[30] Foreign Application Priority Data

Jul. 12, 1991 [FR] France ................. 91 08933

[51] Int. Cl.$^5$ ............................................. B65D 45/00
[52] U.S. Cl. ........................................ 220/327; 220/323
[58] Field of Search ................. 220/315, 323, 327, 320

[56] References Cited

U.S. PATENT DOCUMENTS

| | | | |
|---|---|---|---|
| 547,958 | 10/1895 | McPherson | 220/324 |
| 757,376 | 4/1904 | Whitaker | 220/327 X |
| 2,707,575 | 5/1955 | Wheatley | 220/323 |
| 4,466,550 | 8/1984 | Sullivan | 220/327 X |

FOREIGN PATENT DOCUMENTS 0413896 2/1991 European Pat. Off. .

Primary Examiner—Allan N. Shoap
Assistant Examiner—Paul A. Schwarz
Attorney, Agent, or Firm—Griffin Butler Whisenhunt & Kurtossy

[57] ABSTRACT

The invention relates to a closure device of an orifice bounded by a neck especially for sealing the orifice of a container for chemical, petroleum or analogous products. This device comprises a cover capable of being fixed to the neck by rotation about an axis in a first direction, the cover comprising a base and locking means to prevent inadvertent removal of the cover, said device having locking means comprising an element rotatably mobile in relation to the cover, the rotatable element having on the one hand, interlock means for connecting this element onto the neck in an interlocked manner, these means being adapted to cooperate with complementary interlock means provided on the neck of the element and, on the other hand, means for clamping the rotatable element in relation to the cover.

10 Claims, 2 Drawing Sheets

CLOSURE DEVICE FOR AN ORIFICE PROVIDED WITH A SAFETY DEVICE NOTABLY FOR SEALING THE ORIFICE OF A CONTAINER FOR CHEMICAL PETROLEUM OR ANALOGOUS PRODUCTS

The instant invention relates to a closure device for an orifice and notably to a closure device for the orifice of a container for chemical, petroleum or analogous products, said device being provided with a cover and locking means for preventing inadvertent removal of this cover.

Many containers are used in the chemical industry in general and, more particularly in the transport of sensitive chemicals, the contents of which have to be isolated from the outer medium for obvious reasons of safety, both to avoid environmental pollution and to avoid contamination of the contents themselves.

In general, if one ignores possible leakage from a container, the filling, emptying or checking orifices are the only means by which the contents of a container can come into contact with the outside. In order to isolate the contents therefrom, the orifice of this type of container is classically sealed using closure means comprising a cover adapted to be fixed by rotation, for example by screwing or the like, to a neck delimiting the orifice.

DESCRIPTION THE PRIOR ART

Oscar Gossler KG GmbH, Borsigstrasse 4-6, D-2057 Reinbek markets standard closure devices which comprise a cover having a substantially flat circular base with a continuous wall extending perpendicularly therefrom. The inner surface of this wall is provided on a lower face with a bayonet-type fixing system which is designed to cooperate with complementary means provided on the neck of the orifice to be sealed. This wall is, moreover, provided on one outer face, with tightening flanges.

One disadvantage of these closure devices is that they can be opened accidentally when they are used in extreme or particularly difficult conditions.

In particular, when these closure devices are used on the bridges of tankers it sometimes happens that, in bad weather, objects floating in the high seas reach the surface of the bridge and are hurled against the tightening flanges of the covers, causing accidental opening of the orifices. It will be understood that opening of this kind exposes the cargo to the risks of contamination and/or the environment to the risks of the above-mentioned risks of pollution.

A known solution for overcoming this disadvantage consists in using safety locking means comprising a locking pin associated with each cover. Although satisfactory from the point of view of efficacy, this solution has nonetheless the disadvantage that it necessitates the use of tools both for opening and closing.

OBJECTS OF THE INVENTION

It is thus the main object of this invention to overcome the disadvantages of the above-mentioned prior art by providing a closure device for an orifice provided with a security lock of simple structure which can easily be adapted to any type of standard cover and which does not necessitate the use of any tool either for opening or closing.

It is thus an object of the invention to provide a closure device for an orifice delimited by a neck, notably for sealing the orifice of a container for chemical, petroleum or analogous products, comprising a cover capable of being fixed to the neck by rotation about an axis in a first direction, the cover comprising a base and locking means to prevent inadvertent removal of the cover.

BRIEF SUMMARY OF THE INVENTION

In accordance with the invention, locking means comprising an element freely rotatable in relation to the cover, the rotatable element having, on the one hand, means for connecting this element to the neck in an interlock manner, said means being adapted to cooperate with complementary interlock means provided on the neck of the element and, on the other hand, means for clamping the rotatable element with respect to the cover.

These characteristics provide a closure device equipped with reliable safety locking means which can be easily used without special tools.

According to a preferred characteristic of the invention, the clamping means of the rotatable element are capable of being clamped by rotation about said axis in a second direction opposite to the first.

Thus, any attempt to remove the cover, be it accidental or intentional, before the locking means have been unlocked only reinforce the clamping of the cover to the neck and the cover can only be withdrawn by a combination of successive operations with the result that safe closure of the orifice is ensured.

Other features and advantages of the invention will appear from study of the following description of embodiments of the invention given solely by way of non-limiting example in connection with the appended drawings, in which:

DETAILED DESCRIPTION OF THE INVENTION

The detailed description of a closure device that follows will be made in connection with the application to a closure of a filling and/or emptying orifice of the hold of a tanker designed more particularly to contain sensitive chemicals, petroleum products or the like.

Figure 1:
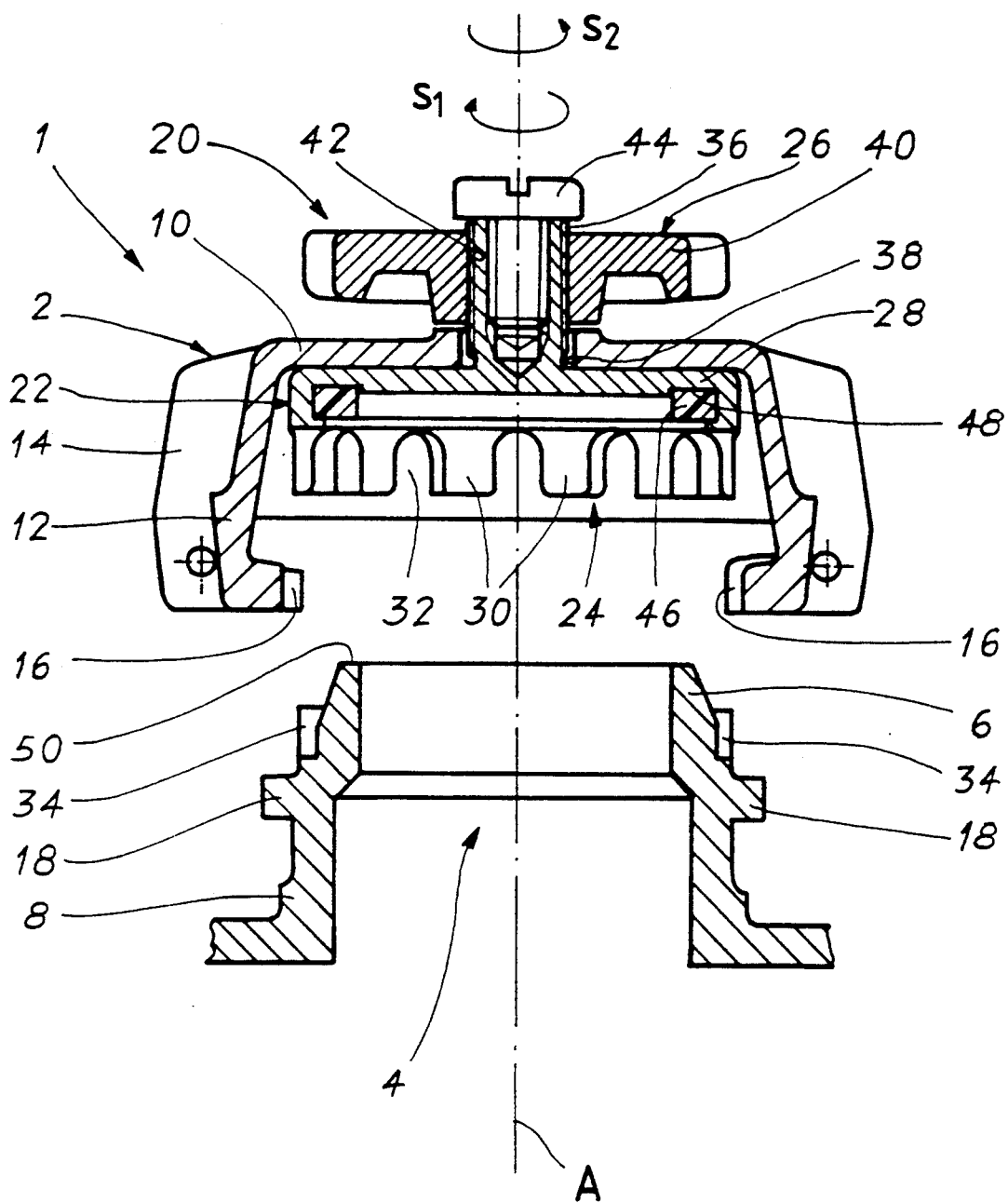
FIG. 1 is an axial section of a first embodiment of a closure device of the invention, this latter being shown just before being fitted to a neck delimiting the orifice of a container to be sealed.

Reference first being made to FIG. 1, this shows an axial section of a first embodiment of a closure means comprising security locking means of the invention, this device being designated with the general reference 1. The closure device 1 is shown just before its installation on an orifice 4 of a container (not shown) which it is designed to seal.

The closure device 1 comprises a cover 2 designed to seal the orifice 4 delimited by a neck 6 substantially cylindrical in shape and having a longitudinal axis A. In the example described, the neck 6 is formed by the extension of one wall 8 of the container.

It goes without saying that according to one embodiment the neck 6 can be fitted to the wall 8 and/or have any other revolution shape.

The cover 2 substantially has the configuration of a bell and comprises a flat base 10 extended laterally by a continuous tapered wall 12. In a manner known per se, the outside surface of the wall 12 comprises tightening flanges 14 and its inner surface is provided with two fixing sections 16 which are diametrically opposed and which extend towards the inside of the cover 2.

These two fixing sections 16 form, together with two other complementary fixing sections 18 provided in similar manner on the neck 6, a classic bayonet-type fixing device. The cover 2 can thus be fixed to the neck 6 in two successive operations, namely by displacement along the axis A, termed sealing axis, and by rotation about this same axis, in a direction shown in the drawing by the arrow S1.

The closure device 1 also comprises locking means 20 to prevent inadvertent removal of the cover 2.

According to the invention, these locking means 20 comprise an element freely rotatable about the axis of sealing A and in relation to the cover 2. This element 22 comprises, on the one hand, connecting means 24 with the neck 6 and, on the other hand, clamping means 26 of the element 22 in relation to the cover 2.

More specifically, the element 22 comprises a round or disk shaped platform 28 which extends substantially in the vicinity of the base 10 of the cover 2. This platform 28 comprises, on ,a first face directed towards the outside of the cover, interlock means 24 and, on the second face opposite the first, clamping means 26.

The interlock means 24 comprise teeth 30 which extend axially from the peripheral edge of the platform 28. These teeth define between them space 32 adapted to receive fingers 34 of complementary shape provided on the neck 6. In the example described, the fingers 34 are four in number and are uniformly distributed on the outer wall of the neck 6. In addition, the platform 28 presents a diameter substantially greater than the outer diameter of the neck 6 in such a way that it covers the latter.

It would of course also have been possible, according to one embodiment, to provide the fingers 34 on the inside wall of the neck 6 and to provide teeth on a diameter of the platform substantially less than the diameter of the interior circumference of the neck 6.

The clamping means 26 comprise a threaded shaft 36 which extends substantially from the centre of the platform 28 through an opening 38 provided in the base 10 of the cover 2. This shaft 36 is associated with a screw 40 forming a tightening wheel. According to a special embodiment of the invention, the shaft 36 has a thread 42 with one direction of tightening S2 (shown by an arrow in the drawing) opposite to the direction of tightening S1 of the cover 2 on the neck 6.

It will be noted that the shaft 36 comprises a terminal stop 44 making it possible to avoid the screw disengaging completely from the shaft 36. This stop 44 is shaped here by a screw screwed at the end of the shaft 36, but any other type of stop can be provided.

In addition, the closure device comprises a sealing member 46 which is provided on the mobile element 22. This sealing member 46, which is of annular form, is disposed in an annular groove 48 provided on the face of the platform 28 provided with teeth 30. The annular groove 48 is provided on the platform in such a way that the seal bears against one sealing surface 50 provided on the peripheral edge of the neck when the cover is put in place along sealing axis A and that the seal is axially compressed against the surface 50 when the cover is tightened onto the neck by rotation of this latter in the direction of the arrow S1.

Figure 2:
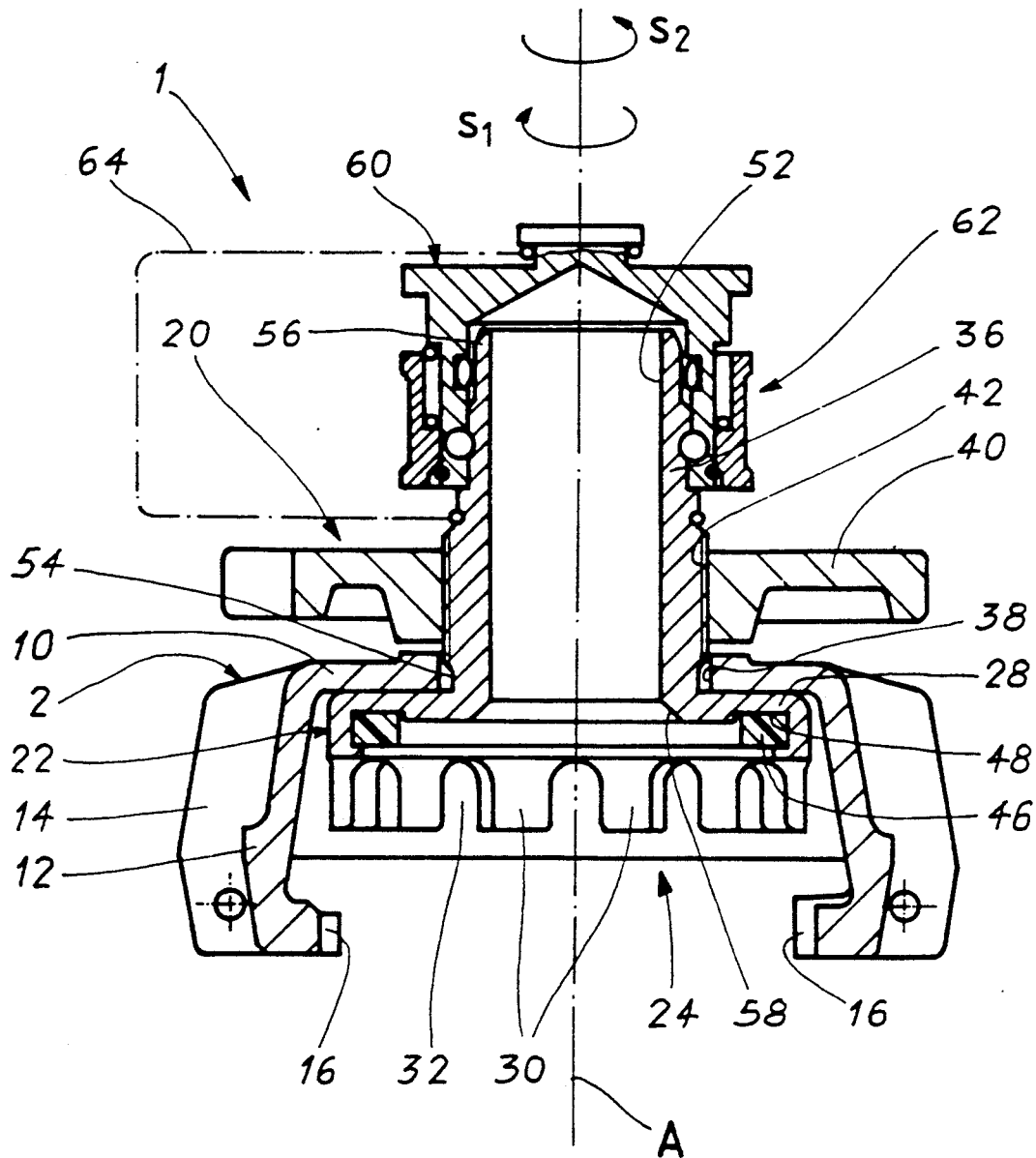
FIG. 2 is an axial section of a second embodiment of a closure device of the invention.

Reference now being made to FIG. 2, this shows the axial section of a second embodiment of the closure device of the invention in which the identical elements to those previously described in connection with FIG. 1 are given the same reference numerals.

In this embodiment, the shaft 36 is provided with a boring 52 extending along the axis A and opening at its two extremities 54, 56. The extremity 54 located on one side of the platform 22 coincides with a central opening 58 provided in the platform 22. The other extremity 56 is associated with a second cover 60 which is fixed to a shaft by a system 62 having a resilient latching system and a conventional security ring, this second cover 60 being connected to the shaft 36 by a small security chain 64 shown by a broken dotted line in the drawing. It will be noted that this boring simplifies the collection of samples from the container without having to open the cover 2.

It will be obvious to the person skilled in the art that the presence of this boring 52 in the shaft 36 in no way changes the principle of operation of the invention described hereinafter.

The operation of these two embodiments of the closure device of the invention described hereinabove is as follows:

Before the cover is placed in position the knurled nut 40 is loosened and the element 22 is freely rotatable about the cover. The cover 2 prepared in this manner is placed above the orifice 4 in such a way that the fixing sections 16 are vertically over the gaps between the fixing sections 18 of the neck 6. The cover is then displaced along the sealing axis A until the sealing member 46 comes into contact with the sealing surface 50. At the same time, the platform 28 is rotated in such a way that the four fingers 34 of the neck engage in four of the corresponding spaces 32. The cover is then rotated about the sealing axis A in the direction of the arrow S1 to, on the one hand, fix the cover 2 by tightening onto the collar 6 and, on the other hand, axially compress the sealing member 46 against the surface 50 to ensure the tightness of the container vis-à-vis the outside. The cover 2 gripped to the neck 6 is then locked on this latter by tightening the screw 40 against the outer face of the base of the cover 2. In this way, if the cover is stressed before its unlocking, for example accidentally by an action against the tightening flanges which tends to make the cover turn in the direction of the arrow S2, this action causes the tightening of the cover against the screw clamping the cover onto the neck in view of the inverse direction of tightening of respectively the cover 2 and the screw 40.

I claim:

1. A closure device for an orifice said closure device comprising, a neck bounding said orifice and having an axis, a cover having fixing means for engaging said neck, said neck having complementary means for engaging said fixing means on said cover as said cover is rotated in a first direction about said axis, said cover including a base and a locking means for preventing inadvertent removal of said cover, said locking means comprising a rotatable platform rotatably supported by said base and having interlock elements thereon cooperating with complementary interlock elements on said neck for preventing rotation of said rotatable platform when said cover is on said neck, and clamping means for clamping said rotatable platform to said base to prevent rotation of said base relative to said rotatable platform.

2. A closure device as claimed in claim 1 wherein said clamping means is mounted to rotate about said axis in a second direction opposite said first direction to clamp said rotatable platform to said cover.

3. A closure device as claimed in claim 1 wherein said interlock means comprises teeth extending from said rotatable platform in the direction of said axis, said teeth being separated by spacers, and said complementary interlock means comprises fingers on said neck adapted to be received into said spaces.

4. A closure device as claimed in claim 3 wherein said teeth extending from said rotatable platform are uniformly distributed on a diameter of said rotatable platform, said neck having an outer diameter which is substantially less than the diameter on which said teeth are distributed.

5. A closure device as claimed in claim 3 wherein an annular groove is provided in a face of said rotatable platform from which said teeth extend, and a sealing member disposed in said annular groove, said sealing member contacting a sealing surface on a peripheral edge of said neck when said cover is on said neck.

6. A closure device as claimed in claim 1 wherein said clamping means comprises a threaded shaft connected to said rotatable platform, said shaft extending through an opening provided in said base, and a screw cooperating with said threaded shaft.

7. A closure device as claimed in claim 1 wherein said clamping means comprises a shaft having an axial discharge bore and said element includes a central opening disposed opposite a first extremity of said bore.

8. A closure device as claimed in claim 7 and further comprising a second cover, said bore having a second extremity associated with said second cover, both said cover and said second cover being located outside said neck when said closure device is mounted on said neck.

9. A closure device as claimed in claim 1 and further comprising a sealing member carried by said rotatable platform.

10. A closure device as claimed in claim 1 wherein said fixing means and said complementary fixing means comprise a bayonet-type joint.

* * * * *